(12) United States Patent
Kuwahara et al.

(10) Patent No.: US 8,785,542 B2
(45) Date of Patent: Jul. 22, 2014

(54) RUBBER COMPOSITION AND TIRE

(71) Applicants: Kuraray Co., Ltd., Kurashiki (JP); Amyris, Inc., Emeryville, CA (US)

(72) Inventors: Shigenao Kuwahara, Kamisu (JP); Kei Hirata, Kamisu (JP); Daisuke Koda, Kamisu (JP)

(73) Assignees: Kuraray Co., Ltd., Kurashiki-shi (JP); Amyris, Inc., Emeryville, CA (US)

( * ) Notice: Subject to any disclaimer, the term of this patent is extended or adjusted under 35 U.S.C. 154(b) by 0 days.

(21) Appl. No.: 14/233,052

(22) PCT Filed: Sep. 21, 2012

(86) PCT No.: PCT/JP2012/074169
§ 371 (c)(1),
(2), (4) Date: Jan. 15, 2014

(87) PCT Pub. No.: WO2013/047348
PCT Pub. Date: Apr. 4, 2013

(65) Prior Publication Data
US 2014/0155536 A1    Jun. 5, 2014

(30) Foreign Application Priority Data
Sep. 30, 2011 (JP) ................................. 2011-218122

(51) Int. Cl.
*C08K 3/04* (2006.01)

(52) U.S. Cl.
USPC ............ 524/496; 524/495; 524/525; 524/526

(58) Field of Classification Search
USPC .................................. 524/495, 496, 525, 526
See application file for complete search history.

(56) References Cited

U.S. PATENT DOCUMENTS

| 5,744,547 | A | 4/1998 | Moritani et al. |
| 2009/0239976 | A1 | 9/2009 | Gardi et al. |
| 2010/0056714 | A1 | 3/2010 | McPhee |
| 2010/0056743 | A1 | 3/2010 | McPhee |

FOREIGN PATENT DOCUMENTS

| JP | 7-53784 | | 2/1995 |
| JP | 9-71620 | | 3/1997 |
| JP | 10-81807 | | 3/1998 |
| JP | 2004-91742 | | 3/2004 |
| JP | 2009-536678 | | 10/2009 |
| WO | WO 2010/027463 | A1 | 3/2010 |
| WO | WO 2010/027464 | A1 | 3/2010 |

OTHER PUBLICATIONS

International Search Report issued Dec. 18, 2012, in PCT/JP12/074169 filed Sep. 21, 2012.

*Primary Examiner* — Peter D Mulcahy
(74) *Attorney, Agent, or Firm* — Oblon, Spivak, McClelland, Maier & Neustadt, L.L.P.

(57) ABSTRACT

The present invention relates to a rubber composition including (A) at least one rubber component selected from the group consisting of a synthetic rubber and a natural rubber; (B) a polymer of farnesene having a weight-average molecular weight of not less than 2,000 and less than 25,000; and (C) carbon black.

10 Claims, No Drawings

RUBBER COMPOSITION AND TIRE

TECHNICAL FIELD

The present invention relates to a rubber composition containing a rubber component and polyfarnesene, and a tire using the rubber composition.

BACKGROUND ART

Tires are required to have not only a good steering stability on a dry road surface (dry grip performance) and a good steering stability on a wet road surface (wet grip performance), but also a low-temperature performance such as a steering stability under low-temperature conditions or on a snow-covered road surface (ice grip performance), i.e., it is required that the tires have a running stability with a high level under extensive environmental conditions.

In general, in order to enhance an ice grip performance of a rubber composition for the tires, it is effective to increase a contact area between the rubber composition and ice-snow. For this reason, it is required that the rubber composition exhibits an excellent flexibility in low-temperature conditions. In order to impart a good flexibility to the rubber composition, there is conventionally known the method of reducing an amount of carbon black compounded in the rubber composition or the method of adjusting an average particle size of the carbon black compounded in the range of from about 100 to about 200 nm. In these conventional methods, the rubber compositions can be improved in ice grip performance by imparting a flexibility thereto, i.e., by reducing an elastic modulus thereof in low-temperature conditions. However, on the other hand, these methods tend to suffer from such a problem that the rubber compositions are deteriorated in dry grip performance owing to hysteresis or reduction in elastic modulus in an ordinary temperature range.

On the other hand, in order to enhance the dry grip performance, there are known the method of using a rubber having a high glass transition temperature (Tg), e.g., a styrene-butadiene rubber in the rubber compositions, or the method of compounding a large amount of carbon black having an average particle size of from about 5 to about 100 nm in the rubber compositions. However, in these methods, there tends to occur such a problem that the rubber compositions are deteriorated in processability upon production owing to increase in viscosity thereof as well as in flexibility under low-temperature conditions, i.e., the rubber compositions are deteriorated in ice grip performance owing to increase in elastic modulus thereof.

Thus, the processability upon production and ice grip performance of the rubber compositions for tires have a contradictory relation with the dry grip performance thereof, and it is therefore considered that the rubber compositions are hardly improved in both of the properties in a well-balanced manner.

In Patent Document 1, as a rubber composition that can be improved in these properties in a well-balanced manner, there is described the rubber composition for tire treads which is compounded with a liquid polymer such as liquid polybutadiene.

Meanwhile, Patent Documents 2 and 3 describe the polymer obtained by polymerizing β-farnesene, but fail to have a sufficient study on practical applications thereof.

CITATION LIST

Patent Literature

Patent Document 1: JP 07-053784A
Patent Document 2: WO 2010/027463A
Patent Document 3: WO 2010/027464A

SUMMARY OF INVENTION

Technical Problem

The rubber composition for tire treads as described in Patent Document 1 is improved in ice grip performance and dry grip performance in a well-balanced manner. However, the improvement is still insufficient, and therefore there is still a strong demand for rubber compositions that are further improved in these properties.

The present invention has been made in view of the above conventional problems. An object of the present invention is to provide a rubber composition that is capable of satisfying all of a processability upon production, an ice grip performance and a dry grip performance at a high level, and a tire obtained using the rubber composition.

Solution to Problem

As a result of extensive and intensive researches, the present inventors have found that when using a conjugated diene polymer having a specific structure, the resulting rubber composition can be improved in all of a processability upon production, an ice grip performance and a dry grip performance. The present invention has been accomplished on the basis of the above finding.

That is, the present invention relates to the following aspects.

[1] A rubber composition including (A) at least one rubber component selected from the group consisting of a synthetic rubber and a natural rubber; (B) a polymer of farnesene having a weight-average molecular weight of not less than 2,000 and less than 25,000; and (C) carbon black, and

[2] A tire including at least partially the above rubber composition.

Advantageous Effects of Invention

According to the present invention, there are provided a rubber composition that is capable of satisfying all of a processability upon production, an ice grip performance and a dry grip performance at a high level, and a tire obtained using the rubber composition.

DESCRIPTION OF EMBODIMENTS

Rubber Composition

The rubber composition of the present invention includes (A) at least one rubber component selected from the group consisting of a synthetic rubber and a natural rubber; (B) a polymer of farnesene having a weight-average molecular weight of not less than 2,000 and less than 25,000; and (C) carbon black.

<Rubber Component (A)>
(1) Synthetic Rubber

Examples of the synthetic rubber used herein include a styrene-butadiene rubber (hereinafter occasionally referred to merely as "SBR"), an isoprene rubber, a butadiene rubber, a butyl rubber, a halogenated butyl rubber, an ethylene propylene diene rubber, a butadiene acrylonitrile copolymer rubber and a chloroprene rubber. Among these synthetic rubbers, preferred are SBR, an isoprene rubber and a butadiene rubber. These synthetic rubbers may be used alone or in combination of any two or more thereof.

(SBR (A-1))

As SBR (A-1), there may be used those generally used in the applications of tires. More specifically, the SBR (A-1) preferably has a styrene content of from 0.1 to 70% by mass and more preferably from 5 to 50% by mass.

Also, the SBR (A-1) preferably has a vinyl content of from 0.1 to 60% by mass and more preferably from 0.1 to 55% by mass.

The weight-average molecular weight (Mw) of the SBR (A-1) is preferably from 100,000 to 2,500,000, more preferably from 150,000 to 2,000,000 and still more preferably from 200,000 to 1,500,000. When the weight-average molecular weight of the SBR (A-1) falls within the above-specified range, the resulting rubber composition can be enhanced in both processability and mechanical strength.

Meanwhile, in the present specification, the weight-average molecular weight is the value measured by the method described below in Examples.

The glass transition temperature (Tg) of the SBR used in the present invention as measured by differential thermal analysis is preferably from −95° C. to 0° C. and more preferably from −95° C. to −5° C. When adjusting Tg of the SBR to the above-specified range, it is possible to suppress increase in viscosity of the SBR and enhance a handling property thereof.

<<Method for Producing SBR (A-1)>>

The SBR (A-1) usable in the present invention may be produced by copolymerizing styrene and butadiene. The production method of the SBR is not particularly limited, and the SBR may be produced by any of an emulsion polymerization method, a solution polymerization method, a vapor phase polymerization method and a bulk polymerization method. Among these polymerization methods, especially preferred are an emulsion polymerization method and a solution polymerization method.

(i) Emulsion-Polymerized Styrene-Butadiene Rubber (E-SBR)

E-SBR may be produced by an ordinary emulsion polymerization method. For example, a predetermined amount of a styrene monomer and a predetermined amount of a butadiene monomer are emulsified and dispersed in the presence of an emulsifying agent and then subjected to emulsion polymerization using a radical polymerization initiator.

As the emulsifying agent, there may be used a long-chain fatty acid salt having 10 or more carbon atoms or a rosinic acid salt. Specific examples of the emulsifying agent include potassium salts and sodium salts of fatty acids such as capric acid, lauric acid, myristic acid, palmitic acid, oleic acid and stearic acid.

As a dispersant for the above emulsion polymerization, there may be usually used water. The dispersant may also contain a waster-soluble organic solvent such as methanol and ethanol unless the use of such an organic solvent gives any adverse influence on stability of the polymerization.

Examples of the radical polymerization initiator include persulfates such as ammonium persulfate and potassium persulfate, organic peroxides and hydrogen peroxide.

In order to suitably adjust a molecular weight of the obtained E-SBR, there may be used a chain transfer agent. Examples of the chain transfer agent include mercaptans such as t-dodecyl mercaptan and n-dodecyl mercaptan; and carbon tetrachloride, thioglycolic acid, diterpene, terpinolene, γ-terpinene and an α-methyl styrene dimer.

The temperature used upon the emulsion polymerization may be appropriately determined according to the kind of radical polymerization initiator used therein, and is usually preferably from 0 to 100° C. and more preferably from 0 to 60° C. The polymerization method may be either a continuous polymerization method or a batch polymerization method. The polymerization reaction may be stopped by adding a terminating agent to the reaction system.

Examples of the terminating agent include amine compounds such as isopropyl hydroxylamine, diethyl hydroxylamine and hydroxylamine; quinone-based compounds such as hydroquinone and benzoquinone; and sodium nitrite.

After terminating the polymerization reaction, an antioxidant may be added, if required. Further, after terminating the polymerization reaction, unreacted monomers may be removed from the resulting latex, if required. Thereafter, the obtained polymer is aggregated by adding a salt such as sodium chloride, calcium chloride and potassium chloride as a coagulant thereto and, if required, while adjusting a pH value of the coagulation system by adding an acid such as nitric acid and sulfuric acid thereto, and then the dispersing solvent is separated from the reaction solution to recover the polymer as a crumb. The thus recovered crumb is washed with water and dehydrated, and then dried using a band dryer or the like to obtain E-SBR. Meanwhile, upon coagulating the polymer, the latex may be previously mixed with an extender oil in the form of an emulsified dispersion to recover the polymer in the form of an oil-extended rubber.

(Ii) Solution-Polymerized Styrene-Butadiene Rubber (S-SBR)

S-SBR may be produced by an ordinary solution polymerization method. For example, styrene and butadiene are polymerized in a solvent using an anion-polymerizable active metal, if required, in the presence of a polar compound.

Examples of the solvent include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene and toluene. These solvents may be usually used in such a range that a monomer is dissolved therein at a concentration of from 1 to 50% by mass.

Examples of the anion-polymerizable active metal include alkali metals such as lithium, sodium and potassium; alkali earth metals such as beryllium, magnesium, calcium, strontium and barium; and lanthanoid-based rare earth metals such as lanthanum and neodymium. Among these active metals, preferred are alkali metals and alkali earth metals, and more preferred are alkali metals. The alkali metals are more preferably used in the form of an organic alkali metal compound.

Specific examples of the organic alkali metal compound include organic monolithium compounds such as n-butyl lithium, sec-butyl lithium, t-butyl lithium, hexyl lithium, phenyl lithium and stilbene lithium; polyfunctional organic lithium compounds such as dilithiomethane, 1,4-dilithiobutane, 1,4-dilithio-2-ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of S-SBR as required.

The organic alkali metal compound may be used in the form of an organic alkali metal amide by allowing a secondary amine such as dibutyl amine, dihexyl amine and dibenzyl amine to react therewith.

The polar compound used in the solution polymerization is not particularly limited as long as the compound do not cause deactivation of the reaction and can be ordinarily used for controlling a microstructure of butadiene moieties and distribution of styrene in a copolymer chain thereof. Examples of the polar compound include ether compounds such as dibutyl ether, tetrahydrofuran and ethylene glycol diethyl ether; tertiary amines such as tetramethyl ethylenediamine and trimethylamine; and alkali metal alkoxides and phosphine compounds.

The temperature used in the above polymerization reaction is usually from −80 to 150° C., preferably from 0 to 100° C. and more preferably from 30 to 90° C. The polymerization method may be either a batch method or a continuous method. Also, in order to improve a random copolymerizability between styrene and butadiene, the styrene and butadiene are preferably supplied to a reaction solution in a continuous or intermittent manner such that a compositional ratio between the styrene and butadiene in the polymerization system falls within a specific range.

The polymerization reaction may be stopped by adding an alcohol such as methanol and isopropanol as a terminating agent to the reaction system. In addition, before adding the terminating agent, there may be added a coupling agent such as tin tetrachloride, tetrachlorosilane, tetramethoxysilane, tetraglycidyl-1,3-bisaminomethyl cyclohexane and 2,4-tolylene diisocyanate which are capable of reacting with an active end of the polymer chain, and a chain end-modifying agent such as 4,4'-bis(diethylamino)benzophenone and N-vinyl pyrrolidone. The polymerization reaction solution obtained after terminating the polymerization reaction may be directly subjected to drying or steam stripping to remove the solvent therefrom, thereby recovering the S-SBR as aimed. Meanwhile, before removing the solvent, the polymerization reaction solution may be previously mixed with an extender oil to recover the S-SBR in the form of an oil-extended rubber.

[Modified Styrene-Butadiene Rubber (Modified SBR)]

In the present invention, there may also be used a modified SBR produced by introducing a functional group into SBR. Examples of the functional group to be introduced include an amino group, an alkoxysilyl group, a hydroxyl group, an epoxy group and a carboxyl group.

In the modified SBR, the site of the polymer into which the functional group is introduced may be either a chain end or a side chain of the polymer.

(Isoprene Rubber (A-2))

The isoprene rubber may be a commercially available isoprene rubber which may be obtained by the polymerization using a Ziegler-based catalyst such as titanium tetrahalide-trialkyl aluminum-based catalysts, diethyl aluminum chloride-cobalt-based catalysts, trialkyl aluminum-boron trifluoride-nickel-based catalysts and diethyl aluminum chloride-nickel-based catalysts; a lanthanoid-based rare earth metal catalyst such as triethyl aluminum-organic acid neodymium salt-Lewis acid-based catalysts; and an organic alkali metal compound as used similarly for production of the S-SBR. Among these isoprene rubbers, preferred are isoprene rubbers obtained by the polymerization using the Ziegler-based catalyst because of a high cis isomer content thereof. In addition, there may also be used those isoprene rubbers having an ultrahigh cis isomer content which are produced using the lanthanoid-based rare earth metal catalyst.

The isoprene rubber has a vinyl content of 50% by mass or less, preferably 40% by mass or less, and more preferably 30% by mass or less. When the vinyl content of the isoprene rubber is more than 50% by mass, the resulting rubber composition tends to be deteriorated in rolling resistance performance. The lower limit of the vinyl content of the isoprene rubber is not particularly limited. The glass transition temperature of the isoprene rubber may vary depending upon the vinyl content thereof, and is preferably −20° C. or lower and more preferably −30° C. or lower.

The weight-average molecular weight of the isoprene rubber is preferably from 90,000 to 2,000,000 and more preferably from 150,000 to 1,500,000. When the weight-average molecular weight of the isoprene rubber falls within the above-specified range, the resulting rubber composition can exhibit a good processability and a good mechanical strength.

The isoprene rubber may partially have a branched structure or may partially contain a polar functional group by using a polyfunctional type modifying agent, for example, a modifying agent such as tin tetrachloride, silicon tetrachloride, an alkoxysilane containing an epoxy group in a molecule thereof, and an amino group-containing alkoxysilane.

(Butadiene Rubber (A-3))

The butadiene rubber may be a commercially available butadiene rubber which may be obtained by the polymerization using a Ziegler-based catalyst such as titanium tetrahalide-trialkyl aluminum-based catalysts, diethyl aluminum chloride-cobalt-based catalysts, trialkyl aluminum-boron trifluoride-nickel-based catalysts and diethyl aluminum chloride-nickel-based catalysts; a lanthanoid-based rare earth metal catalyst such as triethyl aluminum-organic acid neodymium salt-Lewis acid-based catalysts; and an organic alkali metal compound as used similarly for production of the S-SBR. Among these butadiene rubbers, preferred are butadiene rubbers obtained by the polymerization using the Ziegler-based catalyst because of a high cis isomer content thereof. In addition, there may also be used those butadiene rubbers having an ultrahigh cis isomer content which are produced using the lanthanoid-based rare earth metal catalyst.

The butadiene rubber has a vinyl content of 50% by mass or less, preferably 40% by mass or less, and more preferably 30% by mass or less. When the vinyl content of the butadiene rubber is more than 50% by mass, the resulting rubber composition tends to be deteriorated in rolling resistance performance. The lower limit of the vinyl content of the butadiene rubber is not particularly limited. The glass transition temperature of the butadiene rubber may vary depending upon the vinyl content thereof, and is preferably −40° C. or lower and more preferably −50° C. or lower.

The weight-average molecular weight of the butadiene rubber is preferably from 90,000 to 2,000,000 and more preferably from 150,000 to 1,500,000. When the weight-average molecular weight of the butadiene rubber falls within the above-specified range, the resulting rubber composition can exhibit a good processability and a good mechanical strength.

The butadiene rubber may partially have a branched structure or may partially contain a polar functional group by using a polyfunctional type modifying agent, for example, a modifying agent such as tin tetrachloride, silicon tetrachloride, an alkoxysilane containing an epoxy group in a molecule thereof, and an amino group-containing alkoxysilane.

As the rubber component other than the SBR, the isoprene rubber and the butadiene rubber, there may be used one or more rubbers selected from the group consisting of a butyl rubber, a halogenated butyl rubber, an ethylene-propylene rubber, a butadiene-acrylonitrile copolymer rubber and a chloroprene rubber. The method of producing these rubbers is not particularly limited, and any suitable commercially available rubbers may also be used in the present invention.

In the present invention, when using at least one of the SBR, the isoprene rubber, the butadiene rubber, the other synthetic rubber and the natural rubber in combination with the below-mentioned polymer (B) of farnesene, it is possible to improve a processability of the resulting rubber composition, a dispersibility of carbon black therein and a rolling resistance performance thereof.

When using a mixture of two or more kinds of synthetic rubbers, the combination of the synthetic rubbers may be optionally selected unless the effects of the present invention are adversely influenced. Also, various properties of the resulting rubber composition such as a rolling resistance performance and a wear resistance may be appropriately controlled by selecting a suitable combination of the synthetic rubbers.

(2) Natural Rubber

Examples of the natural rubber include TSR such as SMR, SIR and STR; natural rubbers ordinarily used in tire industries, such as RSS; high-purity natural rubbers; and modified natural rubbers such as epoxidized natural rubbers, hydroxylated natural rubbers, hydrogenated natural rubbers and grafted natural rubbers. Among these natural rubbers, SMR20, STR20 and RSS#3 are preferred from the viewpoints of a less variation in quality and a good availability. These natural rubbers may be used alone or in combination of any two or more thereof.

The rubber component (A) includes at least one rubber selected from the group consisting of a synthetic rubber and a natural rubber. When using both of the synthetic rubber and the natural rubber, the compounding ratio between the synthetic rubber and the natural rubber may be optionally determined.

<Polymer (B) of Farnesene>

The rubber composition of the present invention contains a polymer (B) of farnesene having a weight-average molecular weight of not less than 2,000 and less than 25,000 (hereinafter referred to merely as the "polymer (B)").

The polymer of farnesene used in the present invention may be either a polymer of α-farnesene or a polymer of β-farnesene represented by the following formula (I). From the viewpoint of easiness of production of the polymer, preferred is the polymer of β-farnesene.

Meanwhile, in the present specification, the polymer (B) of farnesene means a polymer containing a constitutional unit derived from farnesene in an amount of preferably 90% by mass or more, more preferably 95% by mass or more, still more preferably 98% by mass or more, further still more preferably 99% by mass or more, and most preferably 100% by mass. The polymer of farnesene may also contain a constitutional unit derived from the other monomers such as butadiene and isoprene.

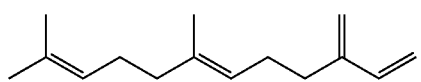

(I)

When the weight-average molecular weight of the polymer (B) is less than 2,000, the resulting tire tends to be deteriorated in mechanical strength, and the polymer (B) tends to be bled out from the rubber composition, resulting in poor stability of a quality of the rubber composition. On the other hand, when the weight-average molecular weight of the polymer (B) is 25,000 or more, the resulting rubber composition tends to be deteriorated in dry grip performance.

For example, the weight-average molecular weight of the polymer (B) is preferably 2,100 or more, more preferably 2,500 or more and still more preferably 3,000 or more, and also is preferably 20,000 or less, more preferably 18,000 or less and still more preferably 15,000 or less.

More specifically, the weight-average molecular weight of the polymer (B) is preferably from 2,000 to 20,000 and more preferably from 2,000 to 15,000. Meanwhile, the weight-average molecular weight of the polymer (B) as used in the present specification is the value measured by the method described below in Examples.

The melt viscosity (as measured at 38° C.) of the polymer (B) is preferably from OA to 3.5 Pa·s, more preferably from 0.1 to 2 Pa·s and still more preferably from 0.1 to 1.5 Pa·s. When the melt viscosity of the polymer falls within the above-specified range, the tire obtained using the rubber composition of the present invention can be improved in ice grip performance and dry grip performance, and further the resulting rubber composition can be easily kneaded and can be improved in processability. Meanwhile, in the present specification, the melt viscosity of the polymer (B) is the value measured by the method described below in Examples.

The molecular weight distribution (Mw/Mn) of the polymer (B) is preferably from 1.0 to 2.0, more preferably from 1.0 to 1.5 and still more preferably from 1.0 to 1.3. When the molecular weight distribution (Mw/Mn) of the polymer (B) falls within the above-specified range, the resulting polymer can suitably exhibit a less variation in viscosity thereof.

In the present invention, the polymer (B) is preferably compounded in an amount of from 0.1 to 100 parts by mass, more preferably from 0.5 to 30 parts by mass, still more preferably from 1 to 20 parts by mass and further still more preferably from 3 to 15 parts by mass on the basis of 100 parts by mass of the rubber component (A). When the amount of the polymer (B) compounded falls within the above-specified range, the resulting rubber composition can be improved in both of an ice grip performance and a dry grip performance.

The polymer (B) may be produced by the methods described in WO 2010/027463A and WO 2010/027464A or the like. Among these methods, preferred are an emulsion polymerization method and a solution polymerization method, and more preferred is a solution polymerization method.

(Emulsion Polymerization Method)

The emulsion polymerization method for producing the polymer (B) may be any suitable conventionally known method. For example, a predetermined amount of a farnesene monomer is emulsified and dispersed in the presence of an emulsifying agent, and then the resulting emulsion is subjected to emulsion polymerization using a radical polymerization initiator.

As the emulsifying agent, there may be used, for example, a long-chain fatty acid salt having 10 or more carbon atoms or a rosinic acid salt. Specific examples of the emulsifying agent include potassium salts and sodium salts of fatty acids such as capric acid, lauric acid, myristic acid, palmitic acid, oleic acid and stearic acid.

As the dispersant for the emulsion polymerization, there may be usually used water, and the dispersant may also contain a water-soluble organic solvent such as methanol and ethanol unless the use of such an organic solvent gives any adverse influence on stability of the polymerization.

Examples of the radical polymerization initiator include persulfates such as ammonium persulfate and potassium persulfate; and organic peroxides and hydrogen peroxide.

In order to adjust a molecular weight of the resulting polymer (B), there may be used a chain transfer agent. Examples of the chain transfer agent include mercaptans such as t-dodecyl mercaptan and n-dodecyl mercaptan; and carbon tetrachloride, thioglycolic acid, diterpene, terpinolene, γ-terpinene and an α-methyl styrene dimer.

The temperature used upon the emulsion polymerization may be appropriately determined according to the kind of radical polymerization initiator used therein, and is usually preferably from 0 to 100° C. and more preferably from 0 to 60° C. The polymerization method may be either a continuous polymerization method or a batch polymerization method. The polymerization reaction may be stopped by adding a terminating agent to the reaction system.

Examples of the terminating agent include amine compounds such as isopropyl hydroxylamine, diethyl hydroxylamine and hydroxylamine; quinone-based compounds such as hydroquinone and benzoquinone; and sodium nitrite.

After terminating the polymerization reaction, an antioxidant may be added, if required. Further, after terminating the polymerization reaction, unreacted monomers may be removed from the resulting latex, if required. Thereafter, the resulting polymer (B) is coagulated by adding a salt such as sodium chloride, calcium chloride and potassium chloride as a coagulant thereto and, if required, while adjusting a pH value of the coagulation system by adding an acid such as nitric acid and sulfuric acid thereto, and then the dispersing solvent is separated from the reaction solution to recover the polymer (B). The thus recovered polymer is washed with water and dehydrated, and then dried to obtain the polymer (B). Meanwhile, upon coagulating the polymer, the latex may be previously mixed, if required, with an extender oil in the form of an emulsified dispersion to recover the polymer (B) in the form of an oil-extended rubber.

(Solution Polymerization Method)

The solution polymerization method for producing the polymer (B) may be any suitable conventionally known method. For example, a β-farnesene monomer may be polymerized in a solvent using a Ziegler-based catalyst, a metallocene-based catalyst or an anion-polymerizable active metal, if required, in the presence of a polar compound.

Examples of the solvent used in the solution polymerization include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene, toluene and xylene.

Examples of the anion-polymerizable active metal include alkali metals such as lithium, sodium and potassium; alkali earth metals such as beryllium, magnesium, calcium, strontium and barium; and lanthanoid-based rare earth metals such as lanthanum and neodymium. Among these active metals, preferred are alkali metals and alkali earth metals, and more preferred are alkali metals. The alkali metals are more preferably used in the form of an organic alkali metal compound.

Specific examples of the organic alkali metal compound include organic monolithium compounds such as methyl lithium, ethyl lithium, n-butyl lithium, sec-butyl lithium, t-butyl lithium, hexyl lithium, phenyl lithium and stilbene lithium; polyfunctional organic lithium compounds such as dilithiomethane, dilithionaphthalene, 1,4-dilithiobutane, 1,4-dilithio-2-ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of the farnesene polymer as required, and is preferably from 0.01 to 3 parts by mass on the basis of 100 parts by mass of farnesene.

The organic alkali metal compound may be used in the form of an organic alkali metal amide by allowing a secondary amine such as dibutyl amine, dihexyl amine and dibenzyl amine to react therewith.

The polar compound may be used in the anion polymerization for controlling a microstructure of farnesene moieties without causing deactivation of the reaction. Examples of the polar compound include ether compounds such as dibutyl ether, tetrahydrofuran and ethylene glycol diethyl ether; tertiary amines such as tetramethyl ethylenediamine and trimethylamine; and alkali metal alkoxides and phosphine compounds.

The temperature used in the above polymerization reaction is usually from −80 to 150° C., preferably from 0 to 100° C. and more preferably from 10 to 90° C. The polymerization method may be either a batch method or a continuous method.

The polymerization reaction may be stopped by adding a terminating agent such as methanol and isopropanol to the reaction system. The resulting polymerization reaction solution may be poured into a poor solvent such as methanol to precipitate the polymer (B). Alternatively, the polymerization reaction solution may be washed with water, and then a solid is separated therefrom and dried to isolate the polymer (B) therefrom.

<Carbon Black (C)>

The rubber composition of the present invention contains carbon black (C) in addition to the rubber component (A) and the polymer (B) from the viewpoint of improving both of an ice grip performance and a dry grip performance of the tire obtained using the rubber composition. The average particle size of the carbon black (C) used in the present invention is preferably from 5 to 100 nm, more preferably from 5 to 70 nm and still more preferably from 5 to 60 nm. When the average particle size of the carbon black (C) is 5 nm or more, the resulting rubber composition can be enhanced in dispersibility, whereas when the average particle size of the carbon black (C) is 100 nm or less, the resulting rubber composition can exhibit sufficient mechanical strength and hardness.

Meanwhile, the average particle size of the carbon black (C) may be determined by calculating an average value of diameters of carbon black particles measured using a transmission electron microscope.

Examples of the carbon black (C) usable in the present invention include carbon blacks such as furnace black, channel black, thermal black, acetylene black and Ketjen black. Among these carbon blacks, from the viewpoints of a high curing rate and an improved mechanical strength of the rubber composition, preferred is furnace black.

Examples of commercially available furnace black as the carbon black (C) having an average particle size of from 5 to 500 nm include "DIABLACK" available from Mitsubishi Chemical Corp., and "SEAST" available from Tokai Carbon Co., Ltd. Examples of commercially available acetylene black as the carbon black (C) having an average particle size of from 5 to 500 nm include "DENKABLACK" available from Denki Kagaku Kogyo K.K. Examples of commercially available Ketjen black as the carbon black (C) having an average particle size of from 5 to 500 nm include "ECP600JD" available from Lion Corp.

The carbon black (C) may be subjected to an acid treatment with nitric acid, sulfuric acid, hydrochloric acid or a mixed acid thereof or may be subjected to a heat treatment in the presence of air for a surface oxidation treatment thereof, from the viewpoint of improving a wettability or a dispersibility of the carbon black (C) in the rubber component (A) and the polymer (B). In addition, from the viewpoint of improving a mechanical strength of the rubber composition of the present invention, the carbon black may be subjected to a heat treatment at a temperature of from 2,000 to 3,000° C. in the presence of a graphitization catalyst. As the graphitization catalyst, there may be suitably used boron, boron oxides (such as, for example, $B_2O_2$, $B_2O_3$, $B_4O_3$ and $B_4O_5$), oxo acids of boron (such as, for example, orthoboric acid, metaboric acid and tetraboric acid) and salts thereof, boron carbonates (such as, for example, $B_4C$ and $B_6C$), boron nitride (such as BN) and other boron compounds.

The average particle size of the carbon black (C) may be controlled by pulverization or the like. In order to pulverize the carbon black (C), there may be used a high-speed rotary mill (such as a hammer mill, a pin mil and a cage mill) or various ball mills (such as a rolling mill, a vibration mill and a planetary mill), a stirring mill (such as a beads mill, an attritor, a flow tube mill and an annular mill) or the like.

In the rubber composition of the present invention, the carbon black (C) is preferably compounded in an amount of 0.1 part by mass or more, more preferably 5 parts by mass or more and still more preferably 20 parts by mass or more on the basis of 100 parts by mass of the rubber component (A) and also in an amount of 100 parts by mass or less, more preferably 90 parts by mass or less and still more preferably 80 parts by mass or less on the basis of 100 parts by mass of the rubber component (A). More specifically, the amount of the carbon black (C) compounded in the rubber composition on the basis of 100 parts by mass of the rubber component (A) is preferably from 0.1 to 100 parts by mass, more preferably from 5 to 90 parts by mass and still more preferably from 20 to 80 parts by mass. When the amount of the carbon black (C) compounded in the rubber composition falls within the above-specified range, the resulting rubber composition can satisfy good mechanical strength, hardness, processability and dispersibility of the carbon black (C) therein, and the tire obtained from the rubber composition can satisfy both of a good ice grip performance and a good dry grip performance.
<Filler>

In the present invention, for the purposes of enhancing a mechanical strength of the rubber composition, improving various properties such as a heat resistance and a weathering resistance thereof, controlling a hardness thereof, and further improving economy by adding an extender thereto, the rubber composition may also contain a filler other than the carbon black (C), if required.

The filler may be appropriately selected according to the applications of the obtained rubber composition. For example, as the filler, there may be used one or more fillers selected from the group consisting of organic fillers, and silica, clay, talc, mica, calcium carbonate, magnesium hydroxide, aluminum hydroxide, barium sulfate, titanium oxide, glass fibers, fibrous fillers and glass balloons. Among these fillers, preferred is silica. Specific examples of the silica include dry silica (anhydrous silicic acid) and wet silica (anhydrous silicic acid). Among these silicas, from the viewpoint of further enhancing a mechanical strength of the resulting rubber composition, preferred is wet silica.

The above filler is preferably compounded in the rubber composition in an amount of from 0.1 to 120 parts by mass, more preferably from 5 to 90 parts by mass and still more preferably from 10 to 80 parts by mass on the basis of 100 parts by mass of the rubber component (A). When the amount of the filler compounded falls within the above-specified range, the resulting rubber composition can be furthermore improved in mechanical strength.

The rubber composition of the present invention may also contain, if required, a softening agent for the purpose of further improving a processability, a flowability or the like of the resulting rubber composition unless the effects of the present invention are adversely influenced. Examples of the softening agent include a process oil such as a silicone oil, TDAE (treated distilled aromatic extracts), MES (mild extracted solvates), RAE (residual aromatic extracts), a paraffin oil, a naphthene oil and an aroma oil; and a liquid polymer such as a low-molecular weight polybutadiene, a low-molecular weight polyisoprene, a low-molecular weight styrene-butadiene copolymer and a low-molecular weight styrene-isoprene copolymer. Meanwhile, the above copolymers may be in the form of either a block copolymer or a random copolymer. The liquid polymer preferably has a weight-average molecular weight of from 2,000 to 80,000 from the viewpoint of a good processability of the resulting rubber composition.

The softening agent is preferably compounded in the rubber composition in an amount of less than 50 parts by mass on the basis of 100 parts by mass of the rubber component (A).

The rubber composition of the present invention may also contain, if required, one or more additives selected from the group consisting of an antioxidant, an oxidation inhibitor, a lubricant, a light stabilizer, a scorch retarder, a processing aid, a colorant such as pigments and coloring matters, a flame retardant, an antistatic agent, a delustering agent, an anti-blocking agent, an ultraviolet absorber, a release agent, a foaming agent, an antimicrobial agent, a mildew-proofing agent, a perfume and a coupling agent, for the purposes of further improving a weathering resistance, a heat resistance, an oxidation resistance or the like of the resulting rubber composition, unless the effects of the present invention are adversely influenced.

Examples of the oxidation inhibitor include hindered phenol-based compounds, phosphorus-based compounds, lactone-based compounds and hydroxyl-based compounds.

Examples of the antioxidant include amine-ketone-based compounds, imidazole-based compounds, amine-based compounds, phenol-based compounds, sulfur-based compounds and phosphorus-based compounds. When compounding silica as the filler, it is preferred that the silica be added together with a silane coupling agent.

Examples of the silane coupling agent include bis(3-triethoxysilylpropyl)tetrasulfide, bis(3-triethoxysilylethyl)tetrasulfide, bis(3-trimethoxysilylpropyl)tetrasulfide, bis(3-triethoxysilylpropyl)trisulfide and bis(3-triethoxysilylpropyl)disulfide. Among these silane coupling agents, bis(3-triethoxysilylpropyl)tetrasulfide is preferred because of an excellent processability of the resulting rubber composition. These additives may be used alone or in combination of any two or more thereof. The above additive is preferably compounded in the rubber composition in an amount of from 0.1 to 15 parts by mass on the basis of 100 parts by mass of the rubber component (A).

The rubber composition of the present invention is preferably used in the from of a crosslinked product produced by the reaction using a crosslinking agent. Examples of the crosslinking agent include sulfur and sulfur compounds, oxygen, organic peroxides, phenol resins and amino resins, quinone and quinone dioxime derivatives, halogen compounds, aldehyde compounds, alcohol compounds, epoxy compounds, metal halides and organic metal halides, and silane compounds. Among these crosslinking agents, preferred are sulfur and sulfur compounds. These crosslinking agents may be used alone or in combination of any two or more thereof. The crosslinking agent is preferably compounded in the rubber composition in an amount of from 0.1 to 10 parts by mass on the basis of 100 parts by mass of the rubber component (A).

When using sulfur as the crosslinking agent, the crosslinking reaction can be accelerated by using the sulfur in combination with a vulcanization aid or a vulcanization accelerator.

Examples of the vulcanization aid include fatty acids such as stearic acid and metal oxides such as zinc oxide.

Examples of the vulcanization accelerator include guanidine-based compounds, sulfene amide-based compounds, thiazole-based compounds, thiuram-based compounds, thiourea-based compounds, dithiocarbamic acid-based compounds, aldehyde-amine-based compounds, aldehyde-ammonia-based compounds, imidazoline-based compounds and xanthate-based compounds. These vulcanization aids or vulcanization accelerators may be used alone or in combination of any two or more thereof. The vulcanization aid or vulcanization accelerator is preferably compounded in the rubber composition of the present invention in an amount of from 0.1 to 15 parts by mass on the basis of 100 parts by mass of the rubber component (A).

The method for producing the rubber composition of the present invention is not particularly limited, and any suitable method may be used in the present invention as long as the respective components are uniformly mixed with each other. The method of uniformly mixing the respective components may be carried out using a closed type kneader of a tangential type or a meshing type such a kneader rudder, a Brabender, a Banbury mixer and an internal mixer, a single-screw extruder, a twin-screw extruder, a mixing roll, a roller or the like in a temperature range of usually from 70 to 270° C.

[Tire]

The tire of the present invention is produced by using the rubber composition of the present invention, and therefore excellent in all of processability upon production, ice grip performance and dry grip performance.

EXAMPLES

The present invention will be described in more detail below by referring to the following examples. It should be noted, however, that the following examples are only illustrative and not intended to limit the invention thereto.

The weight-average molecular weight and melt viscosity of the polymer (B) as well as the Mooney viscosity, dry grip performance and ice grip performance of the rubber composition were evaluated by the following methods.

(1) Weight-Average Molecular Weight

The weight-average molecular weight (Mw) and the molecular weight distribution (Mw/Mn) of each of the synthetic rubber, the polymer (B) and polyisoprene were measured by GPC (gel permeation chromatography) in terms of a molecular weight of polystyrene as a reference standard substance. The measuring apparatuses and conditions are as follows.

Apparatus: GPC device "GPC8020" available from Tosoh Corp.
Separating column: "TSKgelG4000HXL" available from Tosoh Corp.
Detector: "RI-8020" available from Tosoh Corp.
Eluent: Tetrahydrofuran
Eluent flow rate: 1.0 mL/min
Sample concentration: 5 mg/10 mL
Column temperature; 40° C.

(2) Melt Viscosity

The melt viscosity of the polymer (B) was measured at 38° C. using a Brookfield viscometer available from Brookfield Engineering Labs. Inc.

(3) Mooney Viscosity

As an index of a processability of the rubber composition, the Mooney viscosity (ML1+4) of the rubber composition before being cured was measured at 100° C. according to JIS K6300. The values of the respective Examples and Comparative Examples appearing in Table 2 are relative values based on 100 as the value of Comparative Example 2. Also, the values of the respective Examples and Comparative Example appearing in Table 3 are relative values based on 100 as the value of Comparative Example 3; the values of the Example and Comparative Example appearing in Table 4 are relative values based on 100 as the value of Comparative Example 4; the values of the Example and Comparative Example appearing in Table 5 are relative values based on 100 as the value of Comparative Example 5; the values of the Example and Comparative Example appearing in Table 6 are relative values based on 100 as the value of Comparative Example 6; and the values of the Example and Comparative Example appearing in Table 7 are relative values based on 100 as the value of Comparative Example 7. Meanwhile, the smaller Mooney viscosity value indicates a more excellent processability.

(4) Dry Grip Performance

The rubber composition was press-molded to prepare a cured sheet (thickness; 2 mm). The thus prepared sheet was cut into a test piece having a size of 40 mm in length×7 mm in width×2 mm in thickness. The thus obtained test piece was subjected to measurement of tan δ as an index of a dry grip performance thereof using a dynamic viscoelasticity measuring apparatus available from GABO GmbH under the conditions including a measuring temperature of 25° C., a frequency of 10 Hz, a static distortion of 0.5% and a dynamic distortion of 0.1%. The values of the respective Examples and Comparative Examples appearing in Table 2 are relative values based on 100 as the value of Comparative Example 2. Also, the values of the respective Examples and Comparative Example appearing in Table 3 are relative values based on 100 as the value of Comparative Example 3; the values of the Example and Comparative Example appearing in Table 4 are relative values based on 100 as the value of Comparative Example 4; the values of the Example and Comparative Example appearing in Table 5 are relative values based on 100 as the value of Comparative Example 5; the values of the Example and Comparative Example appearing in Table 6 are relative values based on 100 as the value of Comparative Example 6; and the values of the Example and Comparative Example appearing in Table 7 are relative values based on 100 as the value of Comparative Example 7. Meanwhile, the larger value indicates a higher dry grip performance of the rubber composition.

(5) Ice Grip Performance

The test piece obtained by the same method as in the above item (4) was subjected to measurement of E' using a dynamic viscoelasticity measuring apparatus available from GABO GmbH under the conditions including a measuring temperature of −60° C. and 25° C., a frequency of 10 Hz, a static distortion of 0.5% and a dynamic distortion of 0.1% to determine a ratio of E'(−60° C.)/E'(25° C.) as an index of an ice grip performance of the rubber composition. The values of the respective Examples and Comparative Examples appearing in Table 2 are relative values based on 100 as the value of Comparative Example 2. Also, the values of the respective Examples and Comparative Example appearing in Table 3 are relative values based on 100 as the value of Comparative Example 3; the values of the Example and Comparative Example appearing in Table 4 are relative values based on 100 as the value of Comparative Example 4; the values of the Example and Comparative Example appearing in Table 5 are relative values based on 100 as the value of Comparative Example 5; the values of the Example and Comparative Example appearing in Table 6 are relative values based on 100 as the value of Comparative Example 6; and the values of the Example and Comparative Example appearing in Table 7 are relative values based on 100 as the value of Comparative Example 7. Meanwhile, the smaller value indicates a higher ice grip performance of the rubber composition.

Production Example 1

Production of Polyfarnesene (B-1)

A pressure reaction vessel previously purged with nitrogen and then dried was charged with 241 g of cyclohexane as a solvent and 28.3 g of sec-butyl lithium (in the form of a 10.5% by mass cyclohexane solution) as an initiator. The contents of the reaction vessel were heated to 50° C., and then 342 g of β-farnesene were added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining a polyfarnesene (B-1). Various properties of the thus obtained polyfarnesene (B-1) are shown in Table 1.

Production Example 2

Production of Polyfarnesene (B-2)

A pressure reaction vessel previously purged with nitrogen and then dried was charged with 120 g of hexane as a solvent and 1.1 g of n-butyl lithium (in the form of a 17% by mass hexane solution) as an initiator. The contents of the reaction vessel were heated to 50° C., and then 210 g of β-farnesene were added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining a polyfarnesene (B-2). Various properties of the thus obtained polyfarnesene (B-2) are shown in Table 1.

Production Example 3

Production of Polyisoprene

A pressure reaction vessel previously purged with nitrogen and then dried was charged with 206 g of n-hexane as a solvent and 14.2 g of sec-butyl lithium (in the form of a 10.5% by mass cyclohexane solution) as an initiator. The contents of the reaction vessel were heated to 70° C., and then 250 g of isoprene were added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining polyisoprene. Various properties of the thus obtained polyisoprene are shown in Table 1.

The rubber component (A), the polymer (B) and the carbon black (C) used in the following Examples and Comparative Examples are as follows.
Natural Rubber (I):
    SMR20 (natural rubber from Malaysia)
Natural Rubber (II):
    STR20 (natural rubber from Thailand)
Styrene-Butadiene Rubber:
    "JSR1500" available from JSR Corp.; weight-average molecular weight: 450,000; styrene content: 23.5% by weight (produced by emulsion polymerization method)
Butadiene Rubber:
    "BR-01" available from JSR Corp.

Polymer (B):
    Polyfarnesenes (B-1) and (B-2) produced above in Production Examples 1 and 2
Carbon Black (C):
    C-1: "DIABLACK H" available from Mitsubishi Chemical Corp.; average particle size: 30 nm
    C-2: "DIABLACK E" available from Mitsubishi Chemical Corp.; average particle size: 50 nm
    C-3: "DIABLACK I" available from Mitsubishi Chemical Corp.; average particle size: 20 nm
    C-4: "SEAST V" available from Tokai Carbon Co., Ltd.; average particle size: 60 nm
Optional Components
Polyisoprene: Polyisoprene produced in Production Example 3
Stearic Acid: "LUNAC S-20" available from Kao Corp.
Zinc Oxide: Zinc oxide available from Sakai Chemical Industry Co., Ltd.
Antioxidant (1): "NOCRAC 6C" available from Ouchi Shinko Chemical Industrial Co., Ltd.
Antioxidant (2): "ANTAGE RD" available from Kawaguchi Chemical Industry Co., Ltd.
Sulfur: Sulfur fine powder 200 mesh available from Tsurumi Chemical Industry Co., Ltd.
Vulcanization accelerator (1): "NOCCELER NS" available from Ouchi Shinko Chemical Industrial Co., Ltd.
Vulcanization accelerator (2): "NOCCELER CZ-G" available from Ouchi Shinko Chemical Industrial Co., Ltd.
Vulcanization accelerator (3): "NOCCELER D" available from Ouchi Shinko Chemical Industrial Co., Ltd.

Examples 1 to 13 and Comparative Examples 1 to 7

The rubber component (A), polymer (B), carbon black (C), polyisoprene, stearic acid, zinc oxide and antioxidant(s) were charged at such a compounding ratio (part(s) by mass) as shown in Tables 2 to 7 into a closed type Banbury mixer and kneaded together for 6 min such that the initiating temperature was 75° C. and the resin temperature reached 160° C. The resulting mixture was once taken out of the mixer, and cooled to room temperature. Next, the mixture was placed in a mixing roll, and after adding sulfur and the vulcanization accelerator(s) thereto, the contents of the mixing roll were kneaded at 60° C. for 6 min, thereby obtaining a rubber composition. The Mooney viscosity of the thus obtained rubber composition was measured by the above method.

In addition, the resulting rubber composition was press-molded (at 145° C. for 20 min) while being cured to prepare a sheet (thickness: 2 mm). The thus prepared sheet was evaluated for a dry grip performance and an ice grip performance by the above methods. The results are shown in Tables 2 to 7.

TABLE 1

| | Polymer (B) | Weight-average molecular weight (×10³) | Molecular weight distribution Mw/Mn | Melt viscosity (at 38° C.) (Pa · s) |
|---|---|---|---|---|
| Production Example 1 | Polyfarnesene (B-1) | 10 | 1.1 | 0.9 |
| Production Example 2 | Polyfarnesene (B-2) | 90 | 1.2 | 24 |
| Production Example 3 | Polyisoprene | 25 | 1.1 | 15 |

TABLE 2

|  | Examples | | Comparative Examples | |
|---|---|---|---|---|
|  | 1 | 2 | 1 | 2 |
| Components compounded (part(s) by mass) | | | | |
| Component (A) | | | | |
| Natural rubber (I) | 100 | 100 | 100 | 100 |
| Component (B) | | | | |
| Polyfarnesene (B-1) | 10 | 10 | | |
| Polyfarnesene (B-2) | | | 10 | |
| Component (C) | | | | |
| Carbon black (C-1) | 50 | | 50 | 50 |
| Carbon black (C-2) | | 50 | | |
| Other components | | | | |
| Stearic acid | 2 | 2 | 2 | 2 |
| Zinc oxide | 3.5 | 3.5 | 3.5 | 3.5 |
| Antioxidant (1) | 1 | 1 | 1 | 1 |
| Sulfur | 1.5 | 1.5 | 1.5 | 1.5 |
| Vulcanization accelerator (1) | 1 | 1 | 1 | 1 |
| Properties | | | | |
| Mooney viscosity | 78 | 65 | 76 | 100 |
| Dry grip performance (tanδ; at 25° C.) | 123 | 92 | 93 | 100 |
| Ice grip performance (E' (−60° C.)/E' (25° C.)) | 103 | 112 | 123 | 100 |

As shown in Table 2, the rubber compositions obtained in Examples 1 and 2 exhibited a low Mooney viscosity and a good processability as well as a good ice grip performance. In particular, the rubber composition obtained in Example 1 also exhibited a good dry grip performance and therefore could be suitably used as a rubber composition for tires.

TABLE 3

|  | Examples | | | | | | | Com. Ex. 3 |
|---|---|---|---|---|---|---|---|---|
|  | 3 | 4 | 5 | 6 | 7 | 8 | 9 | |
| Components compounded (part(s) by mass) | | | | | | | | |
| Component (A) | | | | | | | | |
| Natural rubber (II) | 100 | 100 | 100 | 100 | 100 | 80 | 80 | 100 |
| Styrene-butadiene rubber | | | | | | 20 | | |
| Butadiene rubber | | | | | | | 20 | |
| Component (B) | | | | | | | | |
| Polyfarnesene (B-1) | 1 | 5 | 20 | 30 | 10 | 10 | 10 | |
| Polyfarnesene (B-2) | | | | | | | | |
| Component (C) | | | | | | | | |
| Carbon black (C-1) | 50 | 50 | 50 | 80 | | 50 | 50 | 50 |
| Carbon black (C-2) | | | | | | | | |
| Carbon black (C-3) | | | | | 50 | | | |
| Other components | | | | | | | | |
| Stearic acid | 2 | 2 | 2 | 2 | 2 | 2 | 2 | 2 |
| Zinc oxide | 3.5 | 3.5 | 3.5 | 3.5 | 3.5 | 3.5 | 3.5 | 3.5 |
| Antioxidant (1) | 1 | 1 | 1 | 1 | 1 | 1 | 1 | 1 |
| Sulfur | 1.5 | 1.5 | 1.5 | 1.5 | 1.5 | 1.5 | 1.5 | 1.5 |
| Vulcanization accelerator (1) | | | | | | | | |
| Properties | | | | | | | | |
| Mooney viscosity | 98 | 88 | 62 | 69 | 76 | 71 | 79 | 100 |
| Dry grip performance (tanδ; at 25° C.) | 101 | 113 | 145 | 204 | 140 | 158 | 135 | 100 |
| Ice grip performance (E' (−60° C.)/E' (25° C.)) | 89 | 93 | 115 | 69 | 80 | 101 | 68 | 100 |

TABLE 4

|  | Example 10 | Comparative Example 4 |
|---|---|---|
| Components compounded (part(s) by mass) | | |
| Component (A) | | |
| Natural rubber (II) | 100 | 100 |
| Component (B) | | |
| Polyfarnesene (B-1) | 10 | |
| Polyfarnesene (B-2) | | 10 |
| Component (C) | | |
| Carbon black (C-4) | 50 | 50 |
| Other components | | |
| Stearic acid | 2 | 2 |
| Zinc oxide | 3.5 | 3.5 |
| Antioxidant (1) | 1 | 1 |
| Sulfur | 1.5 | 1.5 |
| Vulcanization accelerator (1) | 1 | 1 |
| Properties | | |
| Mooney viscosity | 99 | 100 |
| Dry grip performance (tanδ; at 25° C.) | 112 | 100 |
| Ice grip performance (E' (−60° C.)/E' (25° C.)) | 92 | 100 |

TABLE 5

|  | Example 11 | Comparative Example 5 |
|---|---|---|
| Components compounded (part(s) by mass) | | |
| Component (A) | | |
| Natural rubber (II) | 100 | 100 |

TABLE 5-continued

|  | Example 11 | Comparative Example 5 |
|---|---|---|
| Component (B) | | |
| Polyfarnesene (B-1) | 10 | |
| Polyfarnesene (B-2) | | 10 |
| Component (C) | | |
| Carbon black (C-1) | 30 | 30 |
| Other components | | |
| Stearic acid | 2 | 2 |
| Zinc oxide | 3.5 | 3.5 |
| Antioxidant (1) | 1 | 1 |
| Sulfur | 1.5 | 1.5 |
| Vulcanization accelerator (1) | 1 | 1 |
| Properties | | |
| Mooney viscosity | 100 | 100 |
| Dry grip performance (tanδ; at 25° C.) | 110 | 100 |
| Ice grip performance (E' (−60° C.)/E' (25° C.)) | 93 | 100 |

TABLE 6

|  | Example 12 | Comparative Example 6 |
|---|---|---|
| Components compounded (part(s) by mass) | | |
| Component (A) | | |
| Styrene-butadiene rubber | 100 | 100 |
| Component (B) | | |
| Polyfarnesene (B-1) | 10 | |
| Polyfarnesene (B-2) | | 10 |
| Component (C) | | |
| Carbon black (C-1) | 50 | 50 |
| Other components | | |
| Stearic acid | 1 | 1 |
| Zinc oxide | 3.5 | 3.5 |
| Antioxidant (1) | 1 | 1 |
| Antioxidant (2) | 1 | 1 |
| Sulfur | 1.5 | 1.5 |
| Vulcanization accelerator (2) | 1 | 1 |
| Vulcanization accelerator (3) | 0.5 | 0.5 |
| Properties | | |
| Mooney viscosity | 95 | 100 |
| Dry grip performance (tanδ; at 25° C.) | 112 | 100 |
| Ice grip performance (E' (−60° C.)/E' (25° C.)) | 100 | 100 |

TABLE 7

|  | Example 13 | Comparative Example 7 |
|---|---|---|
| Components compounded (part(s) by mass) | | |
| Component (A) | | |
| Natural rubber (II) | 100 | 100 |
| Component (B) | | |
| Polyfarnesene (B-1) | 10 | |
| Polyfarnesene (B-2) | | |
| Polyisoprene | | 10 |
| Component (C) | | |
| Carbon black (C-1) | 50 | 50 |
| Other components | | |
| Stearic acid | 2 | 2 |
| Zinc oxide | 3.5 | 3.5 |

TABLE 7-continued

|  | Example 13 | Comparative Example 7 |
|---|---|---|
| Antioxidant (1) | 1 | 1 |
| Sulfur | 1.5 | 1.5 |
| Vulcanization accelerator (1) | 1 | 1 |
| Properties | | |
| Mooney viscosity | 101 | 100 |
| Dry grip performance (tanδ; at 25° C.) | 99 | 100 |
| Ice grip performance (E' (−60° C.)/E' (25° C.)) | 93 | 100 |

As shown in Table 3, the rubber compositions obtained in Examples 3 to 9 exhibited a good processability owing to a low Mooney viscosity thereof and were capable of satisfying both of a good dry grip performance and a good ice grip performance, and therefore could be suitably used as a rubber composition for tires.

As shown in Table 4, the rubber compositions obtained in Example 10 was excellent especially in dry grip performance and ice grip performance, and therefore could be suitably used as a rubber composition for tires.

As shown in Table 5, the rubber compositions obtained in Example 11 was excellent especially in dry grip performance and ice grip performance, and therefore could be suitably used as a rubber composition for tires.

As shown in Table 6, the rubber compositions obtained in Example 12 was excellent especially in processability and dry grip performance, and therefore could be suitably used as a rubber composition for tires.

As shown in Table 7, the rubber compositions obtained in Example 13 was excellent especially in dry grip performance and ice grip performance, and therefore could be suitably used as a rubber composition for tires.

The invention claimed is:

1. A rubber composition, comprising:
   (A) at least one rubber component selected from the group consisting of a synthetic rubber and a natural rubber;
   (B) from 0.1 to 100 parts by mass of a polymer of farnesene having a weight-average molecular weight of not less than 2,000 and less than 25,000, based on 100 parts by mass of the rubber component (A); and
   (C) from 0.1 to 100 parts by mass of carbon black having an average particle size of from 5 to 100 nm, based on 100 parts by mass of the rubber component (A).

2. The rubber composition of claim 1, wherein the polymer (B) is a homopolymer of β-farnesene.

3. The rubber composition of claim 1, wherein the polymer (B) has a melt viscosity of from 0.1 to 3.5 Pa·s as measured at 38° C.

4. The rubber composition of claim 1, wherein the synthetic rubber is at least one rubber selected from the group consisting of a styrene-butadiene rubber, a butadiene rubber and an isoprene rubber.

5. The rubber composition of claim 4, wherein the styrene-butadiene rubber has a weight-average molecular weight of from 100,000 to 2,500,000.

6. The rubber composition of claim 4, wherein the styrene-butadiene rubber has a styrene content of from 0.1 to 70% by mass.

7. The rubber composition of claim 4, wherein the butadiene rubber has a weight-average molecular weight of from 90,000 to 2,000,000.

8. The rubber composition of claim 4, wherein the butadiene rubber has a vinyl content of 50% by mass or less.

9. The rubber composition of claim 1, wherein the polymer (B) has a molecular weight distribution (Mw/Mn) of from 1.0 to 2.0.

10. A tire, comprising at least partially the rubber composition of claim 1.

* * * * *